E. P. VINCENT.
FLYING MACHINE.
APPLICATION FILED MAR. 2, 1911.
1,005,120.
Patented Oct. 3, 1911.
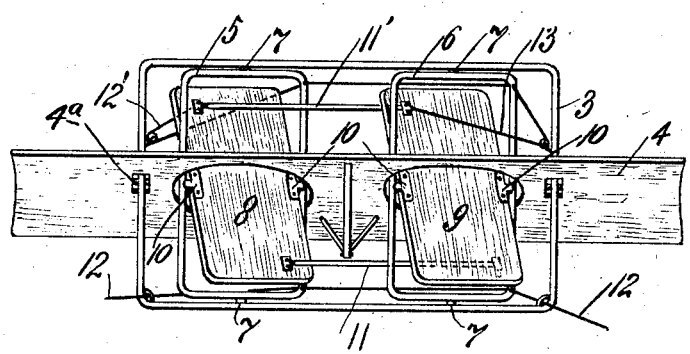
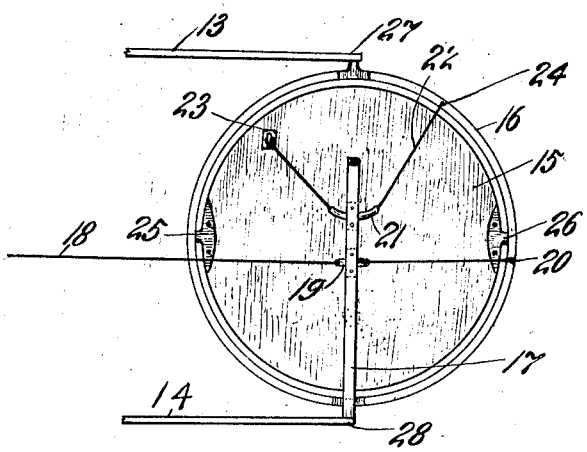
WITNESSES:
INVENTOR.
BY
ATTORNEY.

UNITED STATES PATENT OFFICE.

ERNEST PETER VINCENT, OF NEW YORK, N. Y.

FLYING-MACHINE.

1,005,120.  Specification of Letters Patent.  Patented Oct. 3, 1911.

Original application filed May 28, 1910, Serial No. 564,008. Divided and this application filed March 2, 1911. Serial No. 611,876.

*To all whom it may concern:*

Be it known that I, ERNEST P. VINCENT, formerly a subject of the King of Denmark, and now about to become a citizen of the United States, residing at the borough of Manhattan, in the county of New York and State of New York, have invented certain new and useful Improvements in Flying-Machines, of which the following is a specification, reference being had therein to the accompanying drawing.

My invention relates to improvements in aeronautical devices and has particular reference to an aeroplane having a rear control comprising surface or surfaces adjustable upon vertical and horizontal axes.

This application is a division of my former application Serial No. 564,008 in which one form of the invention is disclosed in combination with a tri-plane type of aeroplane.

In the accompanying drawings, I have illustrated in Figure 1 in front elevation a control apparatus embodying an application of my invention. Fig. 2 is a side view of a similar apparatus with part of the framework broken away.

Referring now to Fig. 1, 3 is an outer framework which may be secured to the machine in any suitable manner and is provided with the main surface 4 which is preferably given a slight curvature as shown and which may be hinged to the outer framework 3 at 4ª as shown. 5 and 6 are frames provided with vertical pivots or bearings 7 upon which they may be rotated and 8 and 9 are surfaces mounted within the frames 5 and 6 upon the horizontal bearings 10 thereby making it possible to turn the surfaces 8 and 9 upon both vertical and horizontal axes. For this purpose the surfaces 8 and 9 are preferably connected to each other by the bars 11 and 11′ as shown and are also connected to each other and to the frames by the cables 12′ and 13 preferably secured to opposite faces of the surfaces 8 and 9 and to the frames 5 and 6 as shown. The frames 5 and 6 are also secured by the cable or pull rope 12 so that it will be seen that as the pull rope 12 is drawn in either direction, the surfaces 8 and 9 are rotated upon the vertical axis of the frames 5 and 6 and are simultaneously tilted upon the horizontal axes 10 within the same. This is accomplished by the bar 11′ which is secured to the surfaces 8 and 9 and by the cable 12′ which is also secured to the bar 11′ and to the frames 5 and 6 as shown.

In the modification shown in Fig. 2, 13 and 14 represent the part of the framework connecting the control apparatus to the main structure of the flying machine. In this modification a single controlling surface 15 is shown provided with the outer circular frame 16 pivotally mounted within the rectangular frame 17 secured to the framework 13—14, the pull rope 18 being secured to the outer circular frame 16 as shown at 20, the same passing through the tubing 19 attached to the frame 17. The rectangular frame 17 is also provided with another piece of curved tubing at 21 which serves as a bearing for the cord 22 connected at 23 to the surface 15 and at 24 to the outer frame 16, the surface 15 having its horizontal bearings at 25 and 26 in the outer circular frame 16 and the outer circular frame having its vertical frame at 27 and 28 in the rectangular frame 17 and framework 13—14. From this it will be seen that as the pull rope 18 is operated the surface 15 is rotated upon its vertical axis and automatically simultaneously rotates upon its horizontal axis in the same manner as that provided for in the construction illustrated in Fig. 1.

Of course it will be understood that various other modifications may be made without departing from the spirit of the invention as set forth in the claims.

I claim:

1. In an aeroplane, a rudder comprising a vertical frame mounted transversely of the machine, a pair of vertical frames mounted upon vertical axes so as to rotate within said first mentioned frame, and a pair of surfaces mounted upon horizontal axes within said last mentioned frames.

2. In an aeroplane, a rudder comprising a vertical frame mounted transversely of the machine, a pair of vertical frames mounted upon vertical axes so as to rotate within said first mentioned frame, and a pair of surfaces mounted upon horizontal axes within said last mentioned frames, in combination with a horizontal surface.

3. In an aeroplane, a rudder comprising a vertical frame mounted transversely of the machine, a vertical frame mounted upon a vertical axis so as to rotate within said first mentioned frame, and a surface mounted upon a horizontal axis within said last mentioned frame, and means in combination therewith whereby said surface rotates upon said vertical and said horizontal axis.

4. In an aeroplane, a rudder comprising a vertical frame mounted transversely of the machine, a vertical frame mounted upon a vertical axis so as to rotate within said first mentioned frame, and a surface mounted upon a horizontal axis within said last mentioned frame, and means in combination therewith whereby said surface rotates upon said vertical and said horizontal axis, and a horizontal surface secured upon a horizontal axis to said transverse vertical frame.

5. In an aeroplane, a rudder comprising a vertical frame mounted transversely of the machine, a vertical frame mounted upon a vertical axis so as to rotate within said first mentioned frame, and a surface mounted upon a horizontal axis within said last mentioned frame, and means in combination therewith whereby said surface rotates upon said vertical and said horizontal axis, and a horizontal surface which may be rotated upon a horizontal axis.

In testimony whereof I affix my signature in presence of two witnesses.

ERNEST PETER VINCENT.

Witnesses:
   LOUISE ENDERLE,
   THOMAS A. HILL.